(12) United States Patent
Furuta

(10) Patent No.: US 12,691,885 B2
(45) Date of Patent: Jul. 28, 2026

(54) MANAGEMENT METHOD AND MANAGEMENT SYSTEM FOR CONTROL MAP

(71) Applicant: TOYOTA JIDOSHA KABUSHIKI KAISHA, Toyota (JP)

(72) Inventor: Hiroki Furuta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/262,032

(22) Filed: Jul. 7, 2025

(65) Prior Publication Data
US 2026/0062010 A1     Mar. 5, 2026

(30) Foreign Application Priority Data
Sep. 5, 2024     (JP) ................................. 2024-152909

(51) Int. Cl.
*B60W 30/20*      (2006.01)
*B60W 30/188*     (2012.01)
*B60W 50/06*      (2006.01)

(52) U.S. Cl.
CPC .......... *B60W 30/20* (2013.01); *B60W 30/188* (2013.01); *B60W 50/06* (2013.01)

(58) Field of Classification Search
CPC .............................. B60W 30/20; B60W 50/06
See application file for complete search history.

(56) References Cited

U.S. PATENT DOCUMENTS

| | | | |
|---|---|---|---|
| 11,766,910 B2 * | 9/2023 | Furuta ................ | B60G 17/0165 |
| | | | 280/5.515 |
| 2013/0103228 A1 * | 4/2013 | Suzuki ................... | F16H 48/19 |
| | | | 701/1 |
| 2015/0308926 A1 * | 10/2015 | Koumura ................ | G01M 7/02 |
| | | | 702/56 |
| 2018/0154723 A1 | 6/2018 | Anderson et al. | |
| 2020/0331454 A1 * | 10/2020 | An ........................ | G01M 15/12 |

* cited by examiner

*Primary Examiner* — Huan Le
(74) *Attorney, Agent, or Firm* — Hunton Andrews Kurth LLP

(57)                ABSTRACT

First and second parameter maps used for vehicle vibration control are generated or updated. When generating or updating the first parameter map, an in-phase input for left and right wheels is calculated as the first parameter related to vertical motion of a reference point. The second parameter map is generated or updated at the same position as the position at which the first parameter map is generated or updated. In the generating or updating the second parameter map, an anti-phase for left and right wheels of the first and second wheels is calculated as the second parameter related to vertical motion of the reference point.

7 Claims, 12 Drawing Sheets

<SPRING LOWER DISPLACEMENT MAP 200>

| POSITION<br>(LAT, LON) | SPRING LOWER<br>DISPLACEMENT<br>(Zu) |
|---|---|
|  |  |
|  |  |
|  |  |

S31

OBTAIN ACTUAL POSITION P0
OF REFERENCE POINT Pr

S32

CALCULATE PREDICTED PASSING POSITION Pf
OF REFERENCE POINT Pr

S33

OBTAIN FROM MAP SPRING
LOWER DISPLACEMENT Zu
AT PREDICTED PASSING POSITION Pf

S34

CALCULATE TARGET CONTROL FORCE Fc_t
FOR SUSPENSION ACTUATOR
AT PREDICTED PASSING POSITION Pf

S35

CONTROL SUSPENSION ACTUATOR

MANAGEMENT METHOD AND MANAGEMENT SYSTEM FOR CONTROL MAP

CROSS-REFERENCE TO RELATED APPLICATION

The present application claims priority under 35 U.S.C. § 119 to Japanese Patent Application No. 2024-152909, filed on Sep. 5, 2024, the contents of which application are incorporated herein by reference in their entirety.

TECHNICAL FIELD

The present disclosure relates to a technology for managing a control map used for vehicle vibration control.

BACKGROUND

US20180154723A discloses a road surface displacement map that shows a correspondence between road surface displacement and location. Vibration control is carried out by utilizing the road surface displacement map. Specifically, the road surface displacement at a predetermined position in front of a vehicle is recognized in advance from the road surface displacement map. Control amount of an active suspension is calculated in advance according to the road surface displacement that is recognized previously. Then, by controlling the active suspension when the wheels pass the predetermined position, the vibration of the vehicle is effectively suppressed.

In US20180154723A, when creating the road surface displacement map, a filtering process is executed to remove frequencies significantly below a vehicle frequency and frequencies significantly above the vehicle frequency from road surface condition data. Here, the road surface condition data can be said to be data on parameters related to the road surface displacement. In addition, the data on the parameters related to road surface displacement can also be said to be the data on the parameters related to the vertical motion of a wheel in contact with the road surface.

In the present disclosure, we consider the creation of a control map that represents a relationship between a position and a parameter related to vertical motion of a reference point based on two or more wheel positions of a vehicle. Such a control map can be created, for example, using time series data of parameters related to the vertical motion of each wheel. However, the parameters related to the vertical motion of each wheel include an extremely low frequency component resulting from changes in altitude, etc. Therefore, when creating the control map, it is desirable to perform a filtering process using a high-pass filter to cut off the extremely low frequency component from the parameters related to the vertical motion of each wheel. However, if an unnecessarily strong high-pass filter is used, anti-phase for left and right wheels derived from different vertical displacements of the left and right wheels will also be cut off.

If vibration control is performed using the control map created from the time series data in which the anti-phase for left and right wheels has been cut, the anti-phase for left and right wheels will not be reflected in the vibration control, resulting in a reduced control effect. This issue can be resolved by using a weak high-pass filter in the filtering process. In this case, however, an in-phase input derived from same vertical displacement of the left and right wheels, which is easily affected by the altitude changes, remains. As a result, in the vibration control using the control map, excessive control amount that attempts to cancel out the in-phase input for left and right wheels may reduce the control effect.

An object of the present disclosure is to provide a technology that can appropriately reflect the anti-phase for left and right wheels and the in-phase input for left and right wheels in the vibration control using the control map that shows the correspondence between the position and the parameters related to vertical motion of the reference point based on two or more wheel positions of the vehicle.

SUMMARY

A first aspect of the present disclosure is a computer implemented method for managing a control map used for vibration control of a vehicle. The method has the following features.

The control map includes first and second parameter maps. The first and second parameter maps each represent a correspondence between a position and a parameter related to vertical motion of a reference point based on two or more wheel positions of the vehicle.

The method comprises generating or updating the first parameter map, and generating or updating the second parameter map for the same position as the position at which the first parameter map is generated or updated.

The generating or updating the first parameter map includes calculating an in-phase input for left and right wheels derived from same vertical displacement of a first wheel and a second wheel as the first parameter related to vertical motion of the reference point, based on time series data of parameters related to the vertical motion of the first wheel and time series data of parameters related to the vertical motion of the second wheel, the first and second wheels constituting the left and right wheels of the vehicle.

The generating or updating the second parameter map includes calculating anti-phase input for left and right wheels derived from different vertical displacements of the first wheel and the second wheel as the second parameter related to vertical motion of the reference point, based on the time series data of parameters related to the vertical motion of the first wheel and the time series data of parameters related to the vertical motion of the second parameter.

A second aspect of the present disclosure has the following features according to the first aspect.

The generating or updating the first parameter map includes executing a filtering process of the in-phase input for left and right wheels with a first high-pass filter.

The generating or updating the second parameter map includes executing the filtering process of the anti-phase for left and right wheels using a second high-pass filter.

The second high-pass filter is weaker than the first high-pass filter.

A third aspect of the present disclosure is a system for managing the control map used for vibration control of a vehicle. The third aspect has the following features.

The system includes one or more processors and one or more memory devices in which the control map is stored.

The control map includes first and second parameter maps. The first and second parameter maps each represent a correspondence between a position and a parameter related to vertical motion of a reference point based on two or more wheel positions of the vehicle.

The one or more processors are configured to execute processing to generate or update the first parameter map, and processing to generate or update the second parameter map for the same position as the position at which the first parameter map is generated or updated.

The processing to generate or update the first parameter map includes processing to calculate an in-phase input for left and right wheels derived from same vertical displacement of a first wheel and a second wheel as the first parameter related to vertical motion of the reference point, based on time series data of parameters related to the vertical motion of the first wheel and time series data of parameters related to the vertical motion of the second wheel, the first and second wheels constituting the left and right wheels of the vehicle.

The processing to generate or update the second parameter map includes processing to calculate an anti-phase input for left and right wheels derived from different vertical displacements of the first wheel and the second wheel as the second parameter related to vertical motion of the reference point, based on the time series data of parameters related to the vertical motion of the first wheel and the time series data of parameters related to the vertical motion of the second parameter.

The fourth aspect of the present disclosure has the following features according to the third aspect.

The processing to generate or update the first parameter map includes a filtering process of the in-phase input for left and right wheels with a first high-pass filter.

The processing to generate or update the second parameter map includes the filtering process of the anti-phase for left and right wheels using a second high-pass filter.

The second high-pass filter is weaker than the first high-pass filter.

According to the first or third aspect, the first and second parameter maps used for the vibration control of the vehicle are generated or updated. In generating or updating the first parameter map, the in-phase input for left and right wheels is calculated as the first parameter related to vertical motion of the reference point. The second parameter map is generated or updated at the same position as the position at which the first parameter map is generated or updated. In generating or updating the second parameter map, the anti-phase for left and right wheels is calculated as the second parameter related to vertical motion of the reference point. Therefore, in the vibration control using the first and second parameter maps, it is possible to appropriately reflect the in-phase input for left and right wheels as the first parameter and the anti-phase for left and right wheels as the second parameter in the vibration control.

According to the second or fourth aspect, the first high-pass filter is used to generate or update the first parameter map, and the second high-pass filter weaker than the first high-pass filter is used to generate or update the second parameter map. Therefore, it is possible to generate or update the first parameter map in which the extremely low frequency component resulting from altitude changes, etc. is removed, and to generate or update the second parameter map in which the anti-phase for left and right wheels remains. Therefore, it is possible to enhance the effect of the first or third aspect.

DESCRIPTION OF EMBODIMENT

An embodiment of the present disclosure will be described with reference to the accompanying drawings.

1. Suspension and Vertical Motion Parameters

Figure 1:
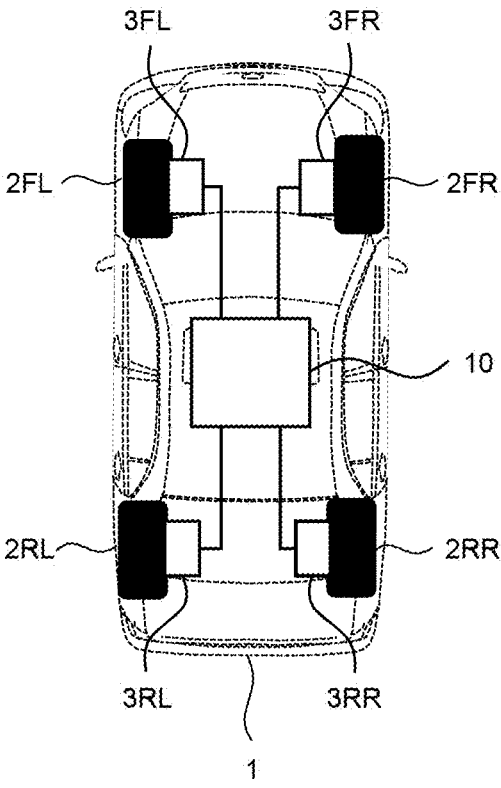
FIG. 1 is a schematic diagram showing a configuration example of a vehicle according to an embodiment of the present disclosure.

FIG. 1 is a schematic diagram showing a configuration example of a vehicle 1 according to the embodiment. The vehicle 1 is equipped with wheels 2 and suspensions 3. The wheels 2 include a left front wheel 2FL, a right front wheel 2FR, a left rear wheel 2RL, and a right rear wheel 2RR. The left front wheel 2FL and the right front wheel 2FR make up left and right wheels on a front wheel axle side, and the left rear wheel 2RL and right rear wheel 2RR make up the left and right wheels on a rear wheel axle side. The suspensions 3FL, 3FR, 3RL, and 3RR are provided for the left front wheel 2FL, the right front wheel 2FR, the left rear wheel 2RL, and the right rear wheel 2RR, respectively. In the following description, unless there is a need to make a distinction, each of the wheels will be referred to as the "wheel 2" and each of the suspensions will be referred to as the "suspension 3".

Figure 2:
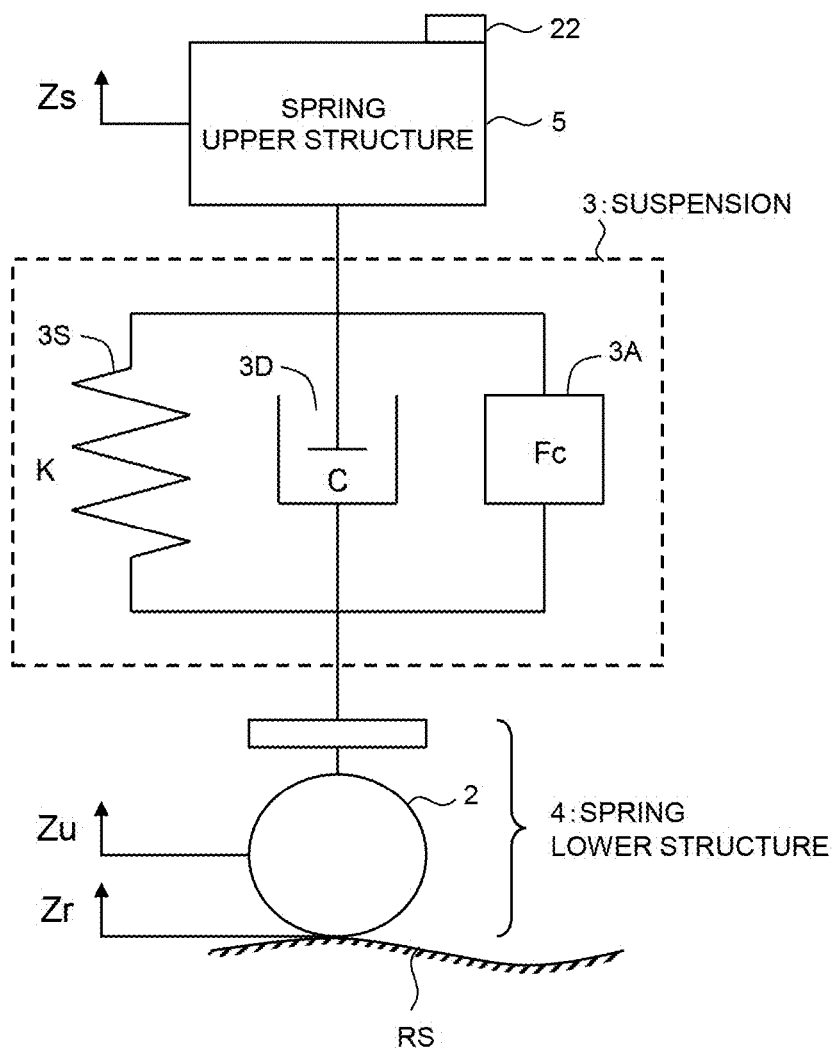
FIG. 2 is a conceptual diagram showing a configuration example of a suspension according to the embodiment.

FIG. 2 is a conceptual diagram showing an example configuration of the suspension 3. The suspension 3 is provided to connect between a spring lower structure 4 and a spring upper structure 5 of the vehicle 1. The spring lower structure 4 includes the wheel 2. The suspension 3 includes a spring 3S, a damper (a shock absorber) 3D, and an actuator 3A. The spring 3S, the damper 3D, and the actuator 3A are arranged in parallel between the spring lower structure 4 and the spring upper structure 5. The spring constant of the spring 3S is "K". The damping coefficient of the damper 3D is "C". The damping force of the damper 3D may be variable. The actuator 3A exerts a vertical control force Fc between the spring lower structure 4 and the spring upper structure 5.

Here, the terms will be defined. A "road surface displacement Zr" is a vertical displacement of a road surface RS. A "spring lower displacement Zu" is the vertical displacement of the spring lower structure 4. A "spring upper displacement Zs" is the vertical displacement of the spring upper structure 5. A "spring lower velocity Zu'" is velocity of the spring lower structure 4 in the vertical direction. A "spring upper velocity Zs'" is the velocity of the spring upper structure 5 in the vertical direction. A "spring lower acceleration Zu''" is acceleration of the spring lower structure 4 in the vertical direction. A "spring upper acceleration Zs''" is the acceleration of the spring upper structure 5 in the vertical direction. The sign of the respective parameters is positive if it is upward and negative if it is downward.

The wheel 2 moves on the road surface RS. As the wheel 2 moves on the road surface RS, a "reference point Pr" of the vehicle 1 moves up and down due to the road surface displacement Zr. The reference point Pr is set to an arbitrary position of the vehicle 1 based on the two or more wheel positions that the vehicle 1 has. Examples of the reference point Pr include a front wheel tread position (a midpoint between the left front wheel 2FL and the right front wheel 2FR), a rear wheel tread position (the midpoint between the left rear wheel 2RL and the right rear wheel 2RR), and a center position of vehicle 1. The reference point Pr may be set separately for the front wheel axle side and the rear wheel axle side of the vehicle 1. In this case, the front wheel tread position is exemplified as the reference point Pr1 on the front wheel axle side, and the rear wheel tread position is exemplified as the reference point Pr2 on the rear wheel axle side. In the embodiment, an example in which the reference points Pr1 and Pr2 are set at the front wheel tread position and the rear wheel tread position will be described.

In the following description, the parameters related to the vertical motion of the reference points Pr1 and Pr2 are referred to as "vertical motion parameters". Examples of the vertical motion parameters include the above-mentioned road surface displacement Zr, the spring lower displacement Zu, the spring lower velocity Zu', the spring lower acceleration Zu ", the spring upper displacement Zs, the spring upper velocity Zs', the spring upper acceleration Zs", etc. The vertical motion parameter can also be said to be a "road surface displacement parameter" related to the road surface displacement Zr.

As an example, in the following description, a case will be considered where the vertical motion parameter of the reference points Pr1 and Pr2 is the spring lower displacement Zu. When generalizing, the "spring lower displacement" in the following explanation should be read as the "vertical motion parameter."

Figure 3:
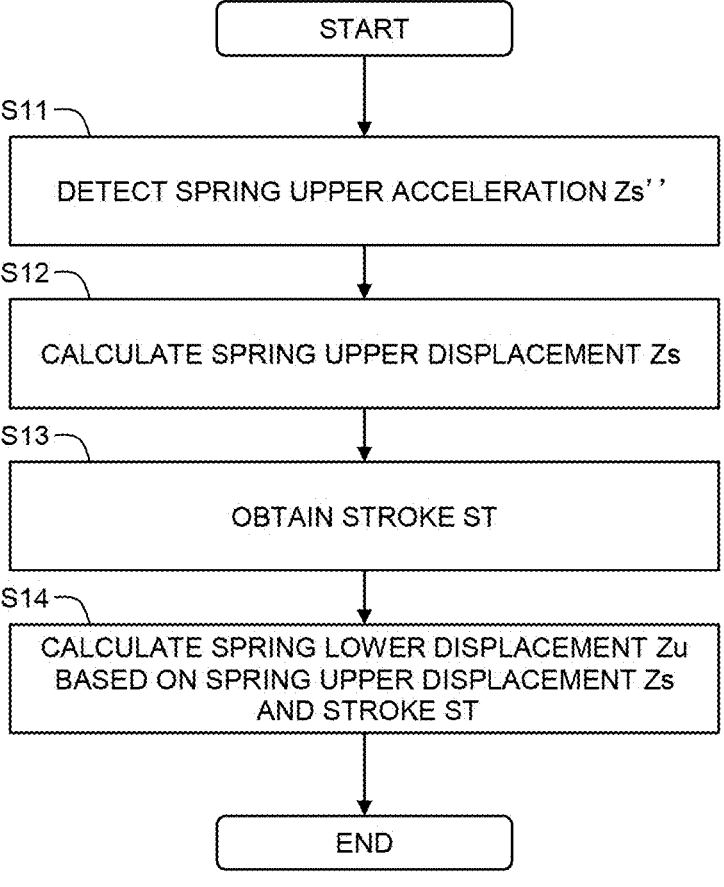
FIG. 3 shows a flowchart of an example of spring lower displacement calculation process.

FIG. 3 shows a flowchart to show an example of the spring lower displacement calculation process.

In step S11, the spring upper acceleration Zs" is detected by a spring upper acceleration sensor 22 installed in the spring upper structure 5. In step S12, the spring upper displacement Zs is calculated by performing second order integration on the spring upper acceleration Zs".

In step S13, a stroke ST (=Zs−Zu), which is a relative displacement between the spring upper structure 5 and the spring lower structure 4, is obtained. For example, the stroke ST is detected by a stroke sensor installed in the suspension 3. As another example, the stroke ST may be estimated based on the spring upper acceleration Zs" by an observer configured based on a single wheel 2-dof model.

In step S14, the difference between the spring upper displacement Zs and the stroke ST is calculated as the spring lower displacement Zu.

As another example, the spring lower acceleration Zu" may be detected by a spring lower acceleration sensor, and the spring lower displacement Zu may be calculated from the spring lower acceleration Zu".

2. Vehicle Control System 2-1. Configuration Example

Figure 4:
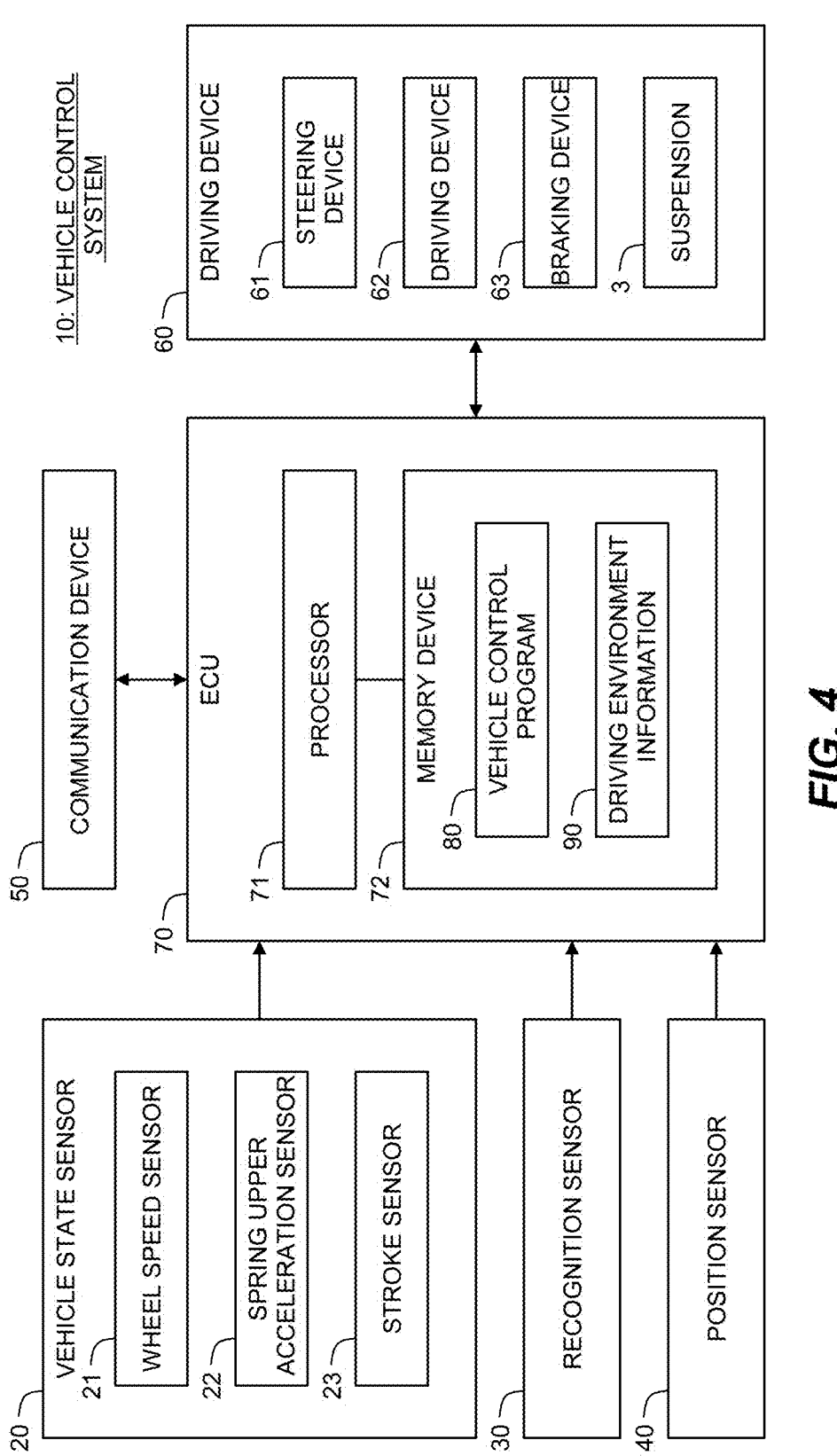
FIG. 4 is a block diagram showing a configuration example of a vehicle control system according to the embodiment.

FIG. 4 is a block diagram showing a configuration example of a vehicle control system 10 according to the embodiment. The vehicle control system 10 is mounted on the vehicle 1 and controls the vehicle 1. The vehicle control system 10 includes a vehicle state sensor 20, a recognition sensor 30, a position sensor 40, a communication device 50, a driving device 60, and a controller 70.

The vehicle state sensor 20 detects the state of the vehicle 1. The vehicle state sensors 20 include a wheel speed sensor 21 that detects vehicle speed V of the vehicle 1, the spring upper acceleration sensor 22 that detects the spring upper acceleration Zs", and the like. The vehicle state sensor 20 may include a stroke sensor 23 that detects the stroke ST. The vehicle state sensors 20 may include a spring lower acceleration sensor. In addition, the vehicle state sensor 20 includes a lateral acceleration sensor, a yaw rate sensor, a steering angle sensor, and the like.

The recognition sensor 30 recognizes (detects) the surrounding situation of the vehicle 1. Examples of the recognition sensor include a camera, a LIDAR (Laser Imaging Detection and Ranging), and a radar.

The position sensor 40 detects a position and an orientation of the vehicle 1. For example, the position sensor 40 includes a Global Navigation Satellite System (GNSS).

The communication device 50 communicates with a device outside of the vehicle 1.

The driving device 60 includes a steering device 61, a driving device 62, a braking device 63, and the suspension 3 (see FIG. 2). The steering device 61 steers the wheels 2. For example, the steering device 61 includes an electric power steering (EPS) equipment. The driving device 62 is a power source that generates a driving force. Examples of the driving device 62 include an engine, an electric motor, an in-wheel motor, and the like. The braking device 63 generates a braking force.

The controller 70 is a computer that controls the vehicle 1. The controller 70 includes one or more processors 71 (hereinafter simply referred to as a "processor 71") and one or more memory devices 72 (hereinafter simply referred to as a "memory device 72"). The processor 71 executes various processing. For example, the processor 71 includes a CPU (Central Processing Unit). The memory device 72 stores various information necessary for the processing executed by the processor 71. Examples of the memory device 72 include a volatile memory, a non-volatile memory, a hard disk drive (HDD), a solid-state drive (SSD), and the like. The controller 70 may include one or more ECUs (Electronic Control Units).

The vehicle control program 80 is a computer program for controlling the vehicle 1 and is executed by the processor 71. The vehicle control program 80 is stored in the memory device 72. Alternatively, the vehicle control program 80 may be recorded in a computer-readable recording medium. The processor 71 executes the vehicle control program 80 to realize the functions of the controller 70.

2-2. Driving Environment Information

Figure 5:
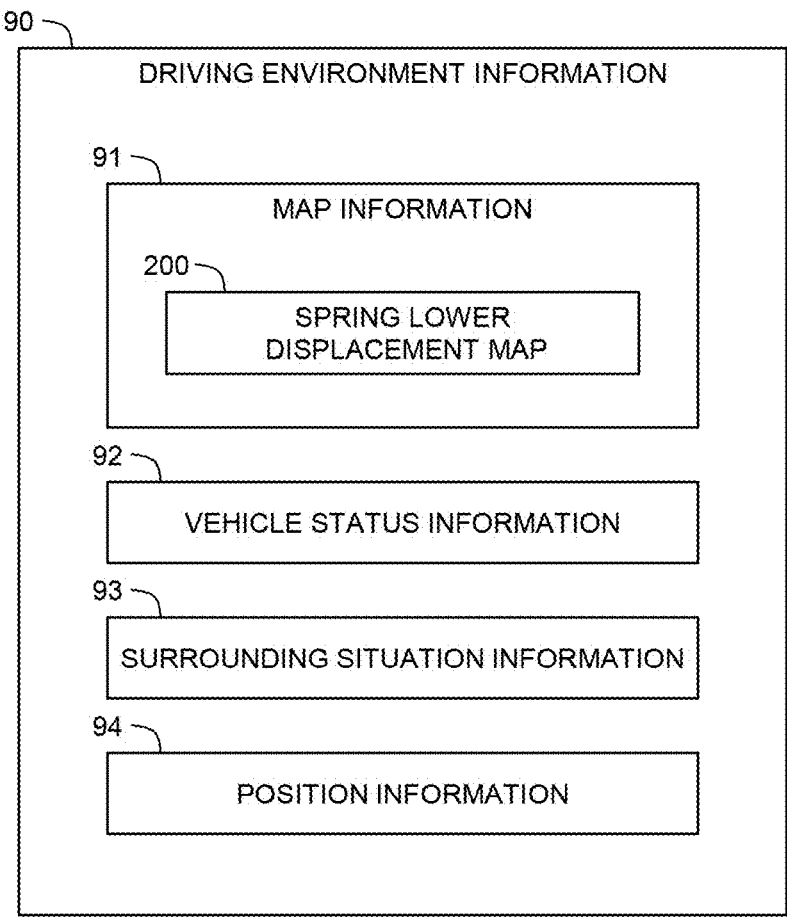
FIG. 5 is a block diagram showing an example of driving environment information according to an embodiment.

FIG. 5 is a block diagram showing an example of driving environment information 90 indicating information on driving environment of the vehicle 1. The driving environment information 90 is stored in the memory device 72. The driving environment information 90 includes map information 91, vehicle status information 92, surrounding situation information 93, and positional information 94.

The map information 91 includes a general navigation map. The map information 91 may indicate lane layout, road shape, and the like. The map information 91 may include positional information such as white lanes, traffic lights, marks, landmarks, etc. The map information 91 is obtained from a map database. The map database may be installed in the vehicle 1 or may be stored in an external management server. In the latter case, the controller 70 communicates with a management server to obtain the necessary map information 91.

The map information 91 further includes a "spring lower displacement map 200." The spring lower displacement map 200 is associated with the reference points Pr1 and Pr2, respectively. Details of the spring lower displacement map 200 will be described later.

The vehicle status information 92 is information indicating the status of the vehicle 1. The controller 70 obtains the vehicle status information 92 from the vehicle state sensor 20. For example, the vehicle status information 92 includes the vehicle speed V, the spring upper acceleration Zs", the stroke ST, the lateral acceleration, yaw rate, steering angle, and the like. The vehicle speed V may be calculated from the vehicle position detected by the position sensor 40. The controller 70 may calculate the spring lower displacement Zu using the method shown in FIG. 3. In that case, vehicle status information 92 also includes the spring lower displacement Zu calculated by the controller 70.

The surrounding situation information 93 is information that indicates situation around the vehicle 1. The controller 70 recognizes the situation around the vehicle 1 using the recognition sensor 30 and acquires the surrounding situation information 93. For example, the surrounding situation information 93 includes image information captured by the camera. As another example, the surrounding situation information 93 includes point cloud information obtained by the LIDAR.

The surrounding situation information 93 further includes "object information" regarding an object surrounding the vehicle 1. Examples of the object include a walker, a bicycle, other vehicles (a preceding vehicle, a parked vehicle, etc.), a road configuration (a white lane, a curb, a guard rail, a wall, a median, a roadside structure, etc.), a mark, a pole, an obstacle, etc. The object information indicates relative position and relative speed of the object with respect to the vehicle 1. For example, by analyzing image information obtained by the camera, it is able to identify the object and calculate the relative position of the object. It is also able to identify the object and obtain its relative position and relative speed based on the point cloud information obtained by the LIDAR.

The positional information 94 is information that indicates the position and orientation of the vehicle 1. The controller 70 obtains positional information 94 from the detection results by the position sensor 40. In addition, the controller 70 may obtain highly accurate positional information 94 by well-known self-location estimate processing (localization) using the object information and the map information 91.

2-3. Vehicle Control

The controller 70 executes vehicle driving control to control the driving of the vehicle 1. The vehicle driving control includes steering control, drive control, and braking control. The controller 70 executes the vehicle driving control by controlling the driving device 60 (the steering device 61, the driving device 62, and the braking device 63). The controller 70 may execute travel assist control to assist the driving of the vehicle 1 based on the driving environment information 90. Examples of the travel assist control include lane maintaining control, collision avoidance control, autonomous driving control, etc.

Furthermore, the controller 70 controls the suspension 3. Typically, the controller 70 executes vibration control to suppress vibration of the vehicle 1 by controlling the suspension 3. For example, the controller 70 controls the actuator 3A to generate a vertical control force Fc between the spring lower structure 4 and the spring upper structure 5 (see FIG. 2). As another example, the controller 70 may variably control the damping force of the damper 3D. The vibration control includes "preview control" described below.

3. Map Management System 3-1. Configuration Example

Figure 6:
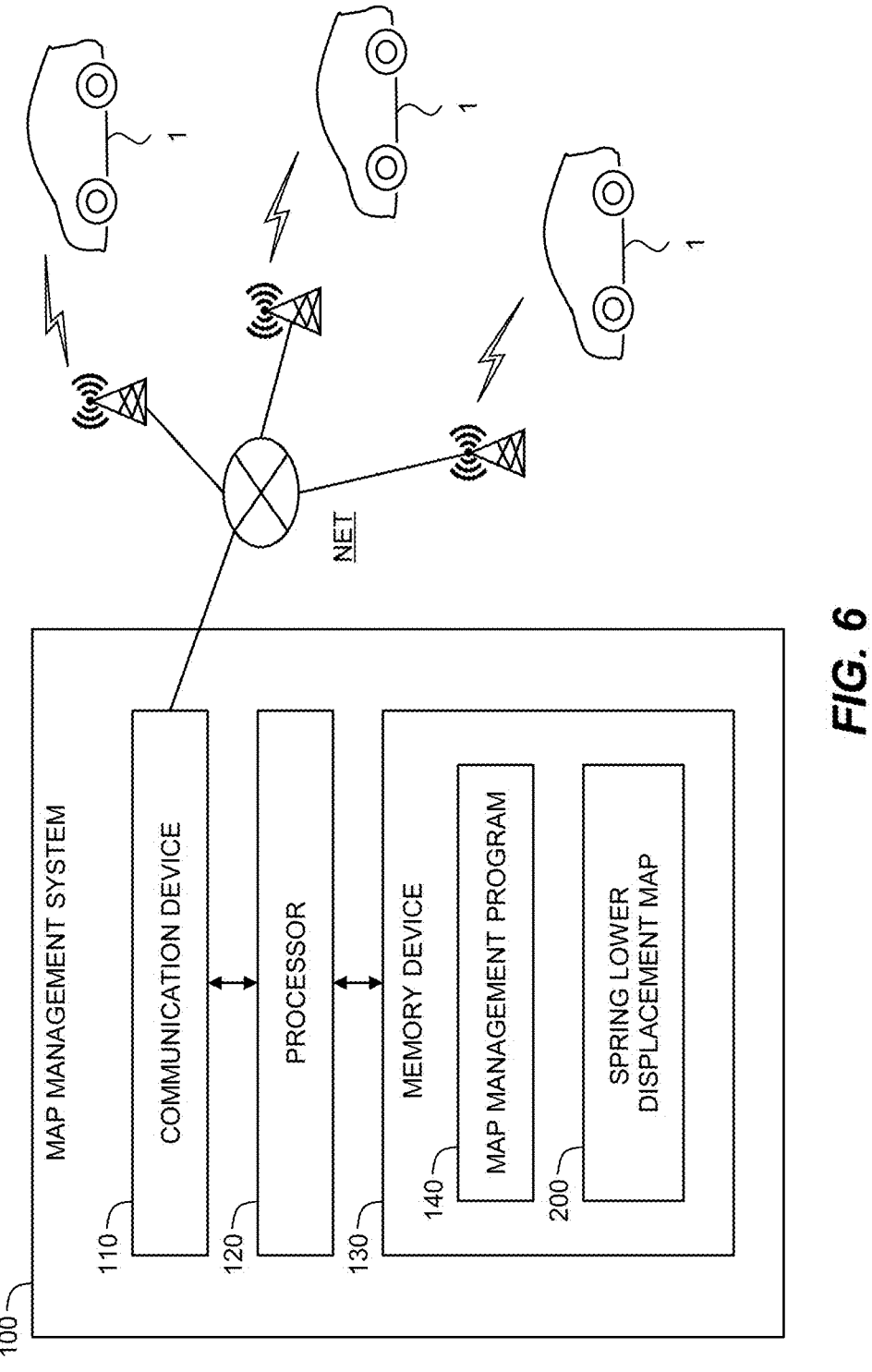
FIG. 6 is a block diagram showing a configuration example of a map management system according to the embodiment.

FIG. 6 is a block diagram showing a configuration example of the map management system 100 according to the embodiment. The map management system 100 is a computer that manages various types of map information. The management of map information includes generating, updating, providing, and distributing of the map information. Typically, the map management system 100 is a management server on a cloud. The map management system 100 may be a distributed system in which multiple servers execute distributed processing.

The map management system 100 includes a communication device 110. The communication device 110 is connected to a communication network NET. For example, the communication device 110 communicates with a number of vehicles 1 via the communication network NET.

The map management system 100 further includes one or more processors 120 (hereinafter simply referred to as a "processor 120") and one or more memory devices 130 (hereinafter simply referred to as a "memory device 130"). The processor 120 executes various information processing. For example, the processor 120 includes a CPU. The memory device 130 stores various types of the map information. The memory device 130 also stores various information necessary for processing by the processor 120. Examples of the memory device 130 include a volatile memory, a non-volatile memory, an HDD, and an SSD.

Map management program 140 is a computer program for the map management, and is executed by the processor 120. The map management program 140 is stored in the memory device 130. Alternatively, the map management program 140 may be recorded in a computer-readable recording medium. The processor 120 executes the map management program 140 to realize the functions of the map management system 100.

The processor 120 communicates with the vehicle control system 10 of the vehicle 1 via the communication device 110. The processor 120 collects various information from the vehicle control system 10, and generates or updates map information based on the collected information. In addition, the processor 120 distributes the map information to the vehicle control system 10. The processor 120 also provides the map information in response to a request from the vehicle control system 10.

3-2. Spring Lower Displacement Map

One piece of map information managed by the map management system 100 is a "spring lower displacement map (a vertical motion parameter map) 200." The spring lower displacement map 200 is a map relating to the spring lower displacement Zu (the vertical motion parameter). The spring lower displacement map 200 is stored in the memory device 130.

Figure 7:
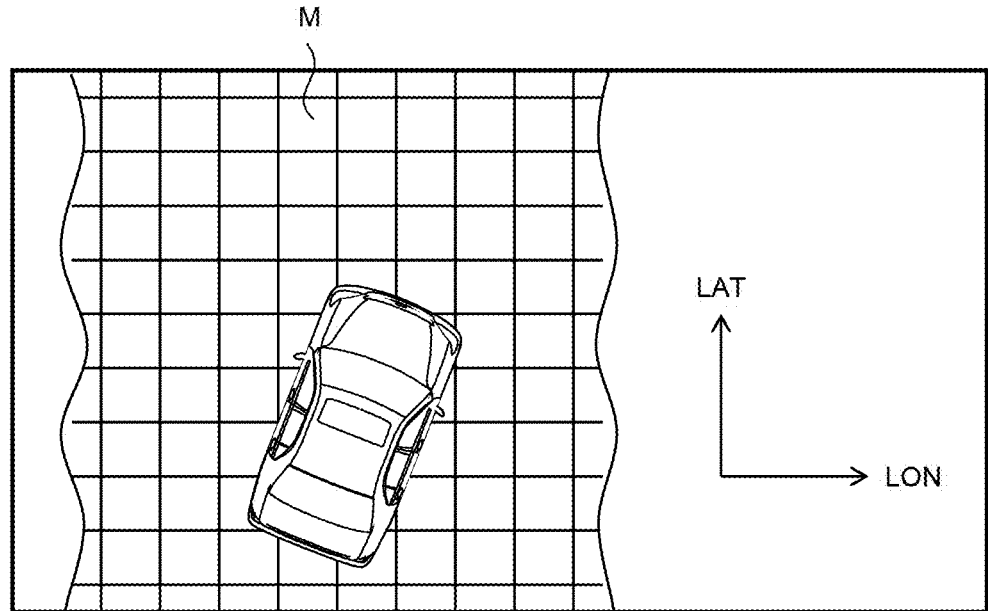
FIG. 7 is a conceptual diagram to explain a spring lower displacement map according to the embodiment.

FIG. 7 is a conceptual diagram to explain the spring lower displacement map 200. An absolute coordinate system in the horizontal plane is defined, for example, by the latitude and longitude directions. A position on the horizontal plane is defined, for example, by latitude LAT and longitude LON. The spring lower displacement map 200 shows a correspondence between the position (LAT, LON) and the spring lower displacement Zu. In other words, the spring lower displacement map 200 represents the spring lower displacement Zu as a function of the position (LAT, LON).

The road area is divided into a mesh shape on the horizontal plane, for example. That is, the road area is divided into a plurality of unit areas M on the horizontal plane. A unit area M is, for example, a square. The length of one side of the square is, for example, 10 cm. The spring lower displacement map 200 shows the correspondence between the position of unit area M and the spring lower displacement Zu. The position of the unit area M may be defined by a representative position of the unit area M (e.g., a central position), or may be defined by a range of the unit area M (latitude range, longitude range). The spring lower displacement Zu of the unit area M is, for example, the average of the spring lower displacement Zu obtained within the unit area M. As the unit area M is made smaller, a resolution of the spring lower displacement map 200 increases.

3-3. Map Generating Process and Updating Process

The processor 120 collects information from multiple vehicles 1 via the communication device 110. The processor 120 then generates or updates the spring lower displacement map 200 based on the information collected from multiple vehicles 1. An example of the map generating process or update process is described in more detail below.

The positions on the spring lower displacement map 200 are the positions through which the reference points Pr1 and Pr2 have passed. The reference points Pr1 and Pr2 are calculated based on the positional information 94 described above. Specifically, a relative positional relationship between the position of each wheel 2 and the reference position of the vehicle 1 for the positional information 94 is known information. In addition, the relative positional relationship between the positions of the wheels 2 and the reference points Pr1 and Pr2 is also known information. Based on these relative positional relationships and the vehicle reference position indicated by positional information 94, the positions of reference points Pr1 and Pr2 can be calculated.

The spring lower displacement Zu is calculated using the method shown in FIG. 3. That is, by using the vehicle state sensor 20 mounted on the vehicle 1, the spring upper displacement Zs and the stroke ST can be obtained. For convenience, the spring upper displacement Zs and the stroke ST are referred to as "sensor-based information." The spring lower displacement Zu is calculated based on this sensor-based information.

For example, the controller 70 of the vehicle control system 10 correlates the positions of wheels 2 at the same time with the sensor-based information. The controller 70 then transmits a set of time-series data on the positions of the wheels 2 and time-series data on the sensor-based information to the map management system 100. The processor 120 of the map management system 100 calculates the spring lower displacement Zu based on the received sensor-based information. Further, the processor 120 generates or updates the spring lower displacement map 200 based on the time series data of the positions of the wheels 2 and the time series data of the spring lower displacement Zu.

In addition, when calculating the spring lower displacement Zu in the map management system 100, since there is no restriction on processing time, a filtering process can be performed using a zero phase filter. By using the zero phase filter, "phase shift" can be prevented.

Figure 8:
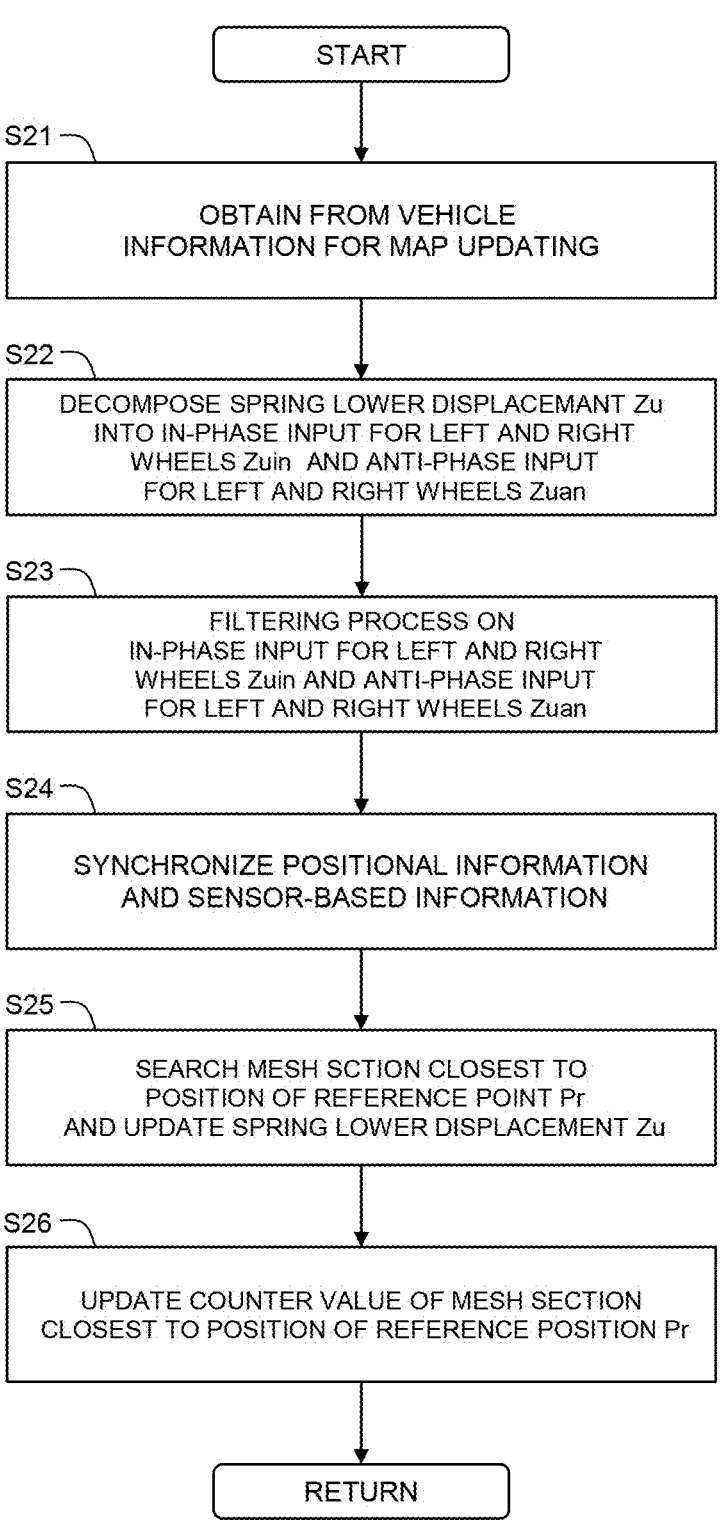
FIG. 8 is a flow chart showing map generating or updating process according to the embodiment.

FIG. 8 is a flow chart showing the map generating or updating process according to the embodiment.

In step S21, the processor 120 of the map management system 100 acquires "information for map updating" from the vehicle 1 (the vehicle control system 10) via the communication device 110. The information for map updating contains time series data on the position of the wheel 2. In addition, the information for map updating includes time-series data of the sensor-based information (e.g., the spring upper displacement Zs and the stroke ST) required to calculate the spring lower displacement Zu. Alternatively, the information for map updating may include time-series data of the spring lower displacement Zu calculated by the controller 70 of the vehicle control system 10.

In step S22, the processor 120 of the map management system 100 decomposes the spring lower displacement Zu into in-phase input for left and right wheels Zuin and anti-phase for left and right wheels Zuan. When the reference points Pr1 and Pr2 are set for the front wheel tread position and the rear wheel tread position, the in-phase input for left and right wheels Zufin and the anti-phase for left and right wheels Zufan on the front wheel axle side are expressed by the following equations (1) and (2), and the in-phase input for left and right wheels on rear axle side Zurin and the anti-phase for left and right wheels Zuran are expressed by the following equations (3) and (4).

$$Zufin = \frac{Zufl + Zufr}{2} \tag{1}$$

$$Zufan = \frac{Zufl - Zufr}{2} \tag{2}$$

$$Zurin = \frac{Zurl + Zurr}{2} \tag{3}$$

$$Zuran = \frac{Zurl - Zur}{2} \tag{4}$$

In equations (1) to (4), Zufl represents the spring lower displacement Zu of the left front wheel 2FL, and Zufr represents the spring lower displacement Zu of the right front wheel 2FR that constitutes the front wheels together with the left front wheel 2FL. Zurl represents the spring lower displacement Zu of the left rear wheel 2RL, and Zurr represents the spring lower displacement Zu of the left rear wheel 2LR that constitutes the rear wheels together with the left rear wheel 2RL.

In another example, the processor 120 of the map management system 100 further decomposes the in-phase input for left and right wheels Zuin into in-phase input for front and rear wheels derived from same vertical displacement of the front and rear wheels (heave) Zuin for the vehicle 1 and anti-phase for front and rear wheels derived from different vertical displacements of front and rear wheels (pitch) Zuan. The front and rear wheels referred to here are the combination of left front wheel 2FL and right front wheel 2FR, and left rear wheel 2RL and right rear wheel 2RR. In this case, the decomposed in-phase input for front and rear wheels Zuin, that is, the in-phase input for left and right wheels and in-phase input for front and rear wheels Zuin-in, are expressed by the following equation (5). In addition, the decomposed anti-phase input for front and rear wheels Zuan, that is, the in-phase input for right and left wheels and anti-phase input for front and rear wheels Zuin-an, are expressed by the following equation (6).

$$Zuin - in = \frac{Zufin + Zurin}{2} \tag{5}$$

$$Zuin - an = \frac{Zufin - Zurin}{2} \tag{6}$$

In step S23, a filtering process is executed on the in-phase input for left and right wheels Zuin and the anti-phase for left and right wheels Zuan. A first high-pass filter is applied to the in-phase input for left and right wheels Zuin to cut extremely low frequency components (e.g., components below 0.5 Hz) resulting from altitude changes, etc. On the other hand, a second high-pass filter is applied to the anti-phase for left and right wheels Zuan to leave extremely low frequency components (for example, components of 0.2 Hz or higher). In other words, the first high-pass filter applied to the in-phase input for left and right wheels Zuin is a stronger high-pass filter than the second high-pass filter applied to the anti-phase for left and right wheels Zuan. Here, the term "strong high-pass filter" means that a cutoff frequency (low side frequency) is high, the filter order is large, or the number of filter stages is large.

The spring lower displacement Zu includes an extremely low frequency component (e.g., a component of 0.5 Hz or less) resulting from changes in altitude, etc. However, this extremely low frequency component also includes the anti-phase for left and right wheels. In this regard, in step S23, a relatively strong first high-pass filter is applied to the filtering process for the in-phase input for left and right wheels Zuin. This cuts out the extremely low frequency components caused by altitude changes from the in-phase input for left and right wheels Zuin. On the other hand, a relatively weak second high-pass filter is applied to the filtering process for the anti-phase for left and right wheels. This prevents extremely low frequency components from being cut off by the filtering process for the anti-phase for left and right wheels.

In another example of step S22, in step S23, the second high-pass filter is applied to the anti-phase for left and right wheels Zuan. On the other hand, a third high-pass filter (a first sub-high-pass filter) is applied to the in-phase input for left and right wheels and in-phase input for front and rear wheels Zuin-in generated by decomposing the in-phase input for left and right wheels Zuin to cut the extremely low frequency components (e.g., components below 0.5 Hz) resulting from altitude changes, etc. On the other hand, a fourth high-pass filter (a second sub-high-pass filter) is applied to the in-phase input for right and left wheels and anti-phase input for front and rear wheels Zuin-an in order to leave the extremely low frequency components (e.g., components of 0.4 Hz or higher). In other words, the third high-pass filter applied to the in-phase input for left and right wheels and in-phase input for front and rear wheels Zuin-in is a stronger high-pass filter than the fourth high-pass filter applied to the in-phase input for right and left wheels and anti-phase input for front and rear wheels Zuin-an. The fourth high-pass filter applied to the in-phase input for right and left wheels and anti-phase input for front and rear wheels is also a stronger high-pass filter than the second high-pass filter applied to the anti-phase for left and right wheels.

The reason why a relatively strong third high-pass filter is applied to the filtering process of the in-phase input for left and right wheels and in-phase input for front and rear wheels Zuin-in, and a relatively weak fourth high-pass filter is applied to the filtering process of the in-phase input for right and left wheels and anti-phase input for front and rear wheels Zuin-an, is the same as the reason for selectively using the first and second high-pass filters.

In step S24, the processor 120 of the map management system 100 synchronizes the positional information and the sensor-based information. For example, processor 120 correlates the position of the wheel 2 and the sensor-based information at the same time, taking into account delays in the positional information, delays in the sensor-based information, differences in sampling cycles, and the like. The processor 120 may complement the sensor-based information having a long sampling cycle with the sensor-based information having a short sampling cycle, or may perform resampling. If the association and other processes have already been executed by the vehicle control system 10, the processing by the processor 120 is omitted. Then, the processor 120 calculates the positions of the reference points Pr1 and Pr2 from the positions of the wheels 2, and associates the positions of the reference points Pr1 and Pr2 at the same timing with the in-phase input for left and right wheels Zuin and the anti-phase for left and right wheels Zuan after the filtering process.

In step S25, the processor 120 of the map management system 100 searches for the mesh section closest to the positions of the reference points Pr1 and Pr2 to generate or update the spring lower displacement Zu (i.e., the in-phase input for left and right wheels Zuin and anti-phase for left and right wheels Zuan shown in the equations (1)-(4)). The spring lower displacement Zu is updated, for example, using the following equation (7).

$$Znew = (Znow + Zold * Nold)/(1 + Nold) \tag{7}$$

In equation (7), Zold is the spring lower displacement Zu originally in the mesh section, Nold is the counter value of this mesh section, Znow is the current spring lower displacement Zu, and Znew is the updated spring lower displacement Zu.

Figure 9:
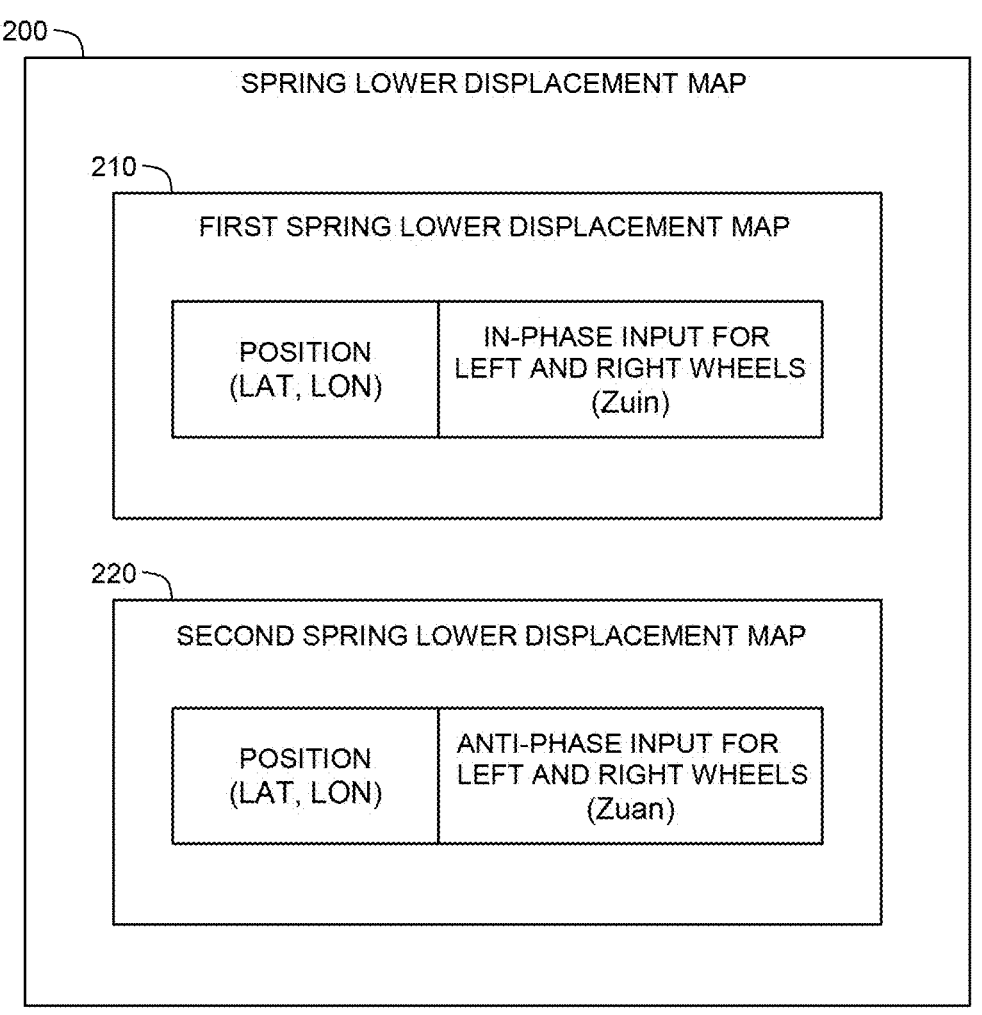
FIG. 9 is a conceptual diagram showing an example of a spring lower displacement map according to the embodiment.

FIG. 9 is a conceptual diagram showing an example of the spring lower displacement map 200. In the example shown in FIG. 9, the spring lower displacement map 200 includes a first spring lower displacement map (a first parameter map) 210 and a second spring lower displacement map (a second parameter map) 220. The first spring lower displacement map 210 is a spring lower displacement map that shows the correspondence between position (LAT, LON) and the in-phase input for left and right wheels Zuin. The second spring lower displacement map 220 is a spring lower displacement map that shows the correspondence between the position (LAT, LON) and the anti-phase for left and right wheels Zuan.

Even if the wheel 2 passes the same position (LAT, LON) on the road, the calculated spring lower displacement Zu may differ depending on the travel direction of the vehicle 1. For example, consider a case where there is a rut on the road. Depending on whether the wheel 2 is moving along or across the rut, the spring lower displacement Zu can be different. Therefore, a travel direction φ of vehicle 1 may be obtained from the positional information 94, and the first spring lower displacement map 210 and the second spring lower displacement map 220 may be created and generated or updated separately for each travel direction φ. Also, the first spring lower displacement map 210 and the second spring lower displacement map 220 may be created differently depending on the width of the tread. Furthermore, these different creations may be performed only for the second spring lower displacement map 220 of the anti-phase for left and right wheels Zuan, which is easily affected by the travel direction φ and the width of the tread.

Figure 10:
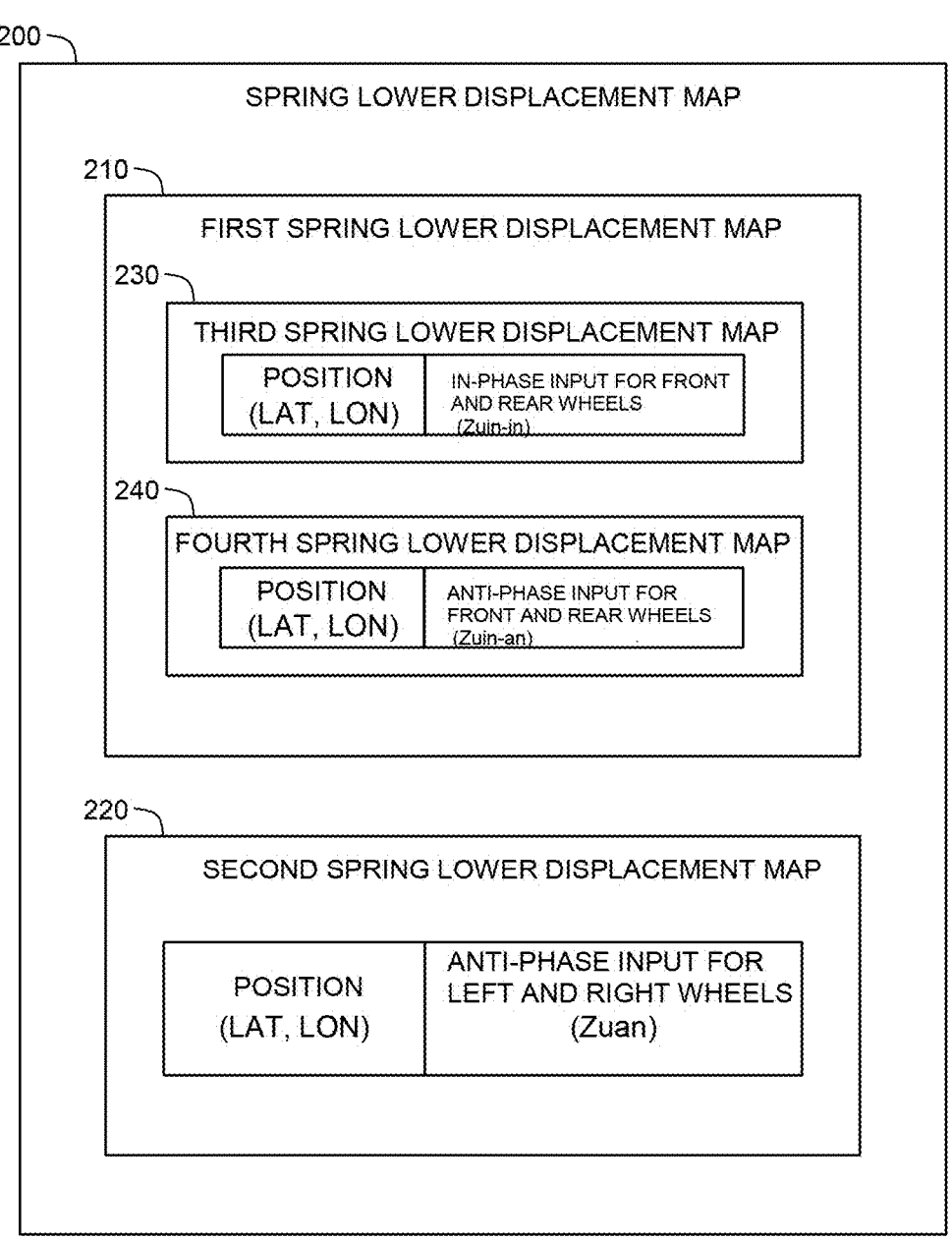
FIG. 10 is a conceptual diagram showing another example of the spring lower displacement map according to the embodiment.

FIG. 10 is a conceptual diagram showing another example of the spring lower displacement map 200. FIG. 10 corresponds to another example of step S22. In the example shown in FIG. 10, the spring lower displacement map 200 includes the first spring lower displacement map (the first parameter map) 210 and the second spring lower displacement map (the second parameter map) 220. Up to this point, the example is the same as that explained in FIG. 9. In another example of step S22, an in-phase input for left and right wheels Zuin decomposition is performed, so that in the example shown in FIG. 10, the first spring lower displacement map 210 includes two types of the spring lower displacement maps. The two types of the spring lower displacement maps are, specifically, a third spring lower displacement map (a first sub-parameter map) 230, which shows the correspondence between the position (LAT, LON) and the in-phase input for left and right wheels and in-phase input for front and rear wheels Zuin-in, and a fourth spring lower displacement map (a second sub-parameter map) 240, which shows the correspondence between the position (LAT, LON) and the in-phase input for right and left wheels and anti-phase input for front and rear wheels Zuin-an.

Returning to FIG. 8, in step S26, the processor 120 of the map management system 100 updates the counter value of the mesh section that was generated or updated in step S25 using the following equation (8).

$$Nnew = 1 + Nold \tag{8}$$

In equation (8), Nold is the counter value for the current mesh partition, and Nnew is the counter value after generation or update.

3-4. Modified Example

The vehicle control system 10 of the vehicle 1 may maintain a database of the spring lower displacement map 200 and may generate or update its own spring lower displacement map 200. In other words, the map management system 100 may be included in the vehicle control system 10.

4. Preview Control Using Spring Lower Displacement Map

The controller 70 of the vehicle control system 10 communicates with the map management system 100 via the communication device 50. The controller 70 obtains the spring lower displacement map 200 of the area including the actual position of the vehicle 1 from the map management system 100. The spring lower displacement map 200 is stored in the memory device 72. Then, the controller 70 executes the "preview control", which is a type of the vibration control, based on the spring lower displacement map 200.

Figure 11:
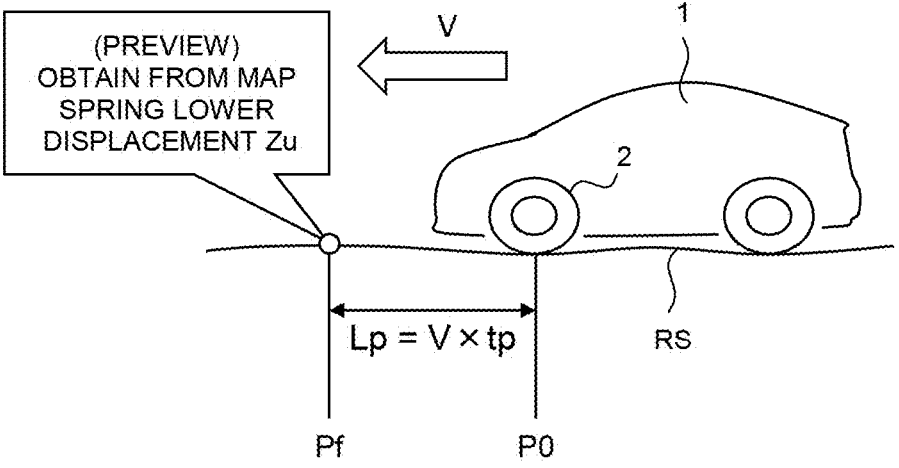
FIG. 11 is a conceptual diagram to explain preview control using the spring lower displacement map according to the embodiment.
Figure 12:
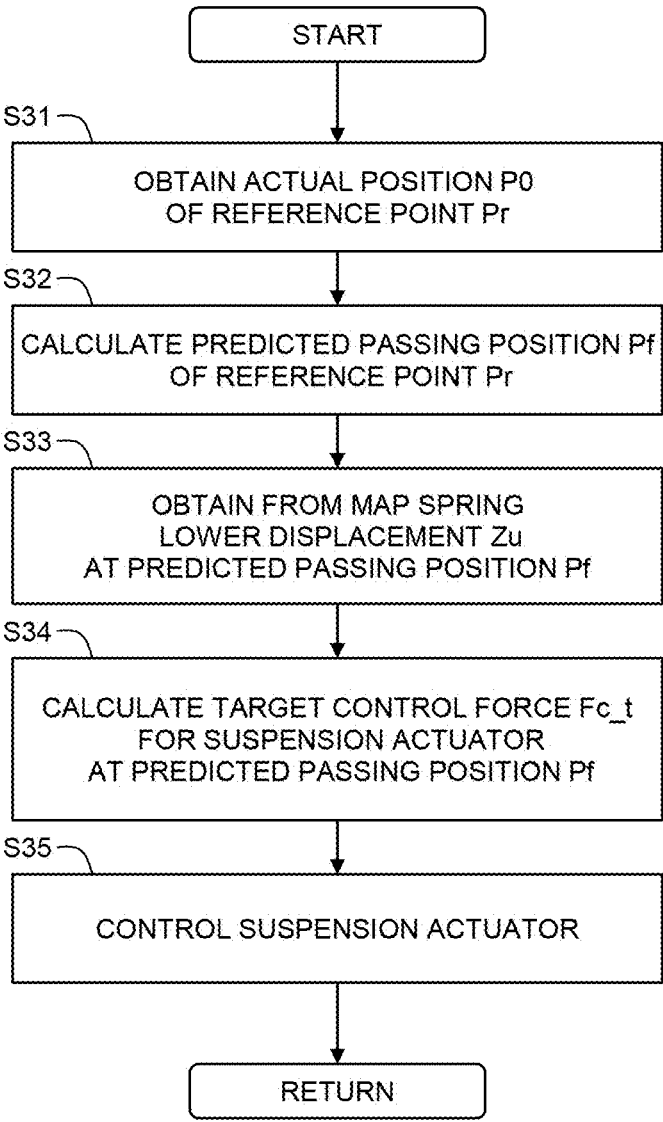
FIG. 12 is a flowchart showing the preview control using the spring lower displacement map according to the embodiment.

FIG. 11 is a conceptual diagram to explain the preview control. FIG. 12 is a flowchart showing the preview control. The preview control will be explained with reference to FIGS. 11 and 12.

In step S31, the controller 70 obtains an actual position P0 of the reference point Pr. The relative positional relationship between the position of each wheel 2 and the reference position of the vehicle 1 for the positional information 94 is known information. In addition, the relative positional relationship between the positions of the wheels 2 and the reference points Pr1 and Pr2 is also known information. Based on these relative positional relationships and the vehicle reference position indicated by the positional information 94, each of the actual positions P0 of the reference points Pr1 and Pr2 are calculated.

In step S32, the controller 70 calculates a predicted passing position Pf of the reference point Pr after a preview time tp. The preview time tp is set to, for example, a time equal to or longer than a time required for the calculation processing and communication processing required until the actuator 3A of the suspension 3 is operated. The preview time tp may be fixed or may be variable depending on the situation. The preview length Lp is given by the product of the preview time tp and the vehicle speed V. The predicted passing position Pf is a position in front of the actual position P0 by the preview length Lp. As a modified example, the controller 70 may calculate a predicted traveling route based on the vehicle speed V and the steering angle of the wheel 2, and calculate the predicted passing position Pf based on the predicted traveling route. When the spring lower displacement map 200 is created differently depending on the travel direction φ, the predicted travel direction of the vehicle 1 is also calculated in addition to the predicted passing position Pf.

In step S33, the controller 70 reads out the spring lower displacement Zu at the predicted passing position Pf from the spring lower displacement map 200. The spring lower displacement Zu read out from the spring lower displacement map 200 is specifically the in-phase input for left and right wheels Zuin and anti-phase for left and right wheels Zuan for reference point Pr1, and the in-phase input for left and right wheels Zuin and anti-phase for left and right wheels Zuan for reference point Pr2. When the spring lower displacement map 200 is created differently depending on the travel direction q, the spring lower displacement Zu is read out from the spring lower displacement map 200 based on the combination of the predicted travel direction and the predicted passing position Pf.

In step S34, the controller 70 calculates a target control force Fc_t for the actuator 3A of the suspension 3 based on the spring lower displacement Zu at the predicted passing position Pf. The target control force Fc_t is calculated, for example, using the following equations (9)-(12).

$$Ffl = Zufin \cdot \alpha fin + Zufan \cdot \alpha fan \tag{9}$$

$$Ffr = Zufin \cdot \alpha fin - Zufan \cdot \alpha fan \tag{10}$$

$$Frl = Zurin \cdot \alpha rin + Zuran \cdot \alpha ran \tag{11}$$

$$Frr = Zurin \cdot \alpha rin - Zuran \cdot \alpha ran \tag{12}$$

In the equations (9) to (12), αfin is an in-phase input for left and right wheels gain on the front wheel axle side, αfan is an anti-phase for left and right wheels gain on the front wheel axle side, αrin is an in-phase input of left and right wheels on rear axle side gain, and αran is an anti-phase input for left and right wheels on rear axle side gain.

When the in-phase input for left and right wheels Zuin is decomposed, the "in-phase input for left and right wheels Zuin" in equations (9)-(10) is replaced with the "in-phase input for left and right wheels and in-phase input for front and rear wheels Zuin-in", the "anti-phase for left and right wheels Zufan" is replaced with the "in-phase input for right and left wheels and anti-phase input for front and rear wheels Zuin-an", the "in-phase input for left and right wheels gain αfin" is replaced with an "in-phase input for left and right wheels and in-phase input for front and rear wheels gain αfrin", and the "anti-phase for left and right wheels gain αfan" is replaced with an "in-phase input for right and left wheels and anti-phase input for front and rear wheels gain αfran". In addition, in the equations (11) and (12), the "in-phase input for left and right wheels Zuin" is replaced with the "in-phase input for left and right wheels and in-phase input for front and rear wheels Zuin-in", the "anti-phase for left and right wheels Zuran" is replaced with the "in-phase input for right and left wheels and anti-phase input for front and rear wheels Zuin-an", the "in-phase input for left and right wheels gain arin" is replaced with an "in-phase input for left and right wheels and in-phase input for front and rear wheels gain afrin", and the "anti-phase for left and right wheels gain aran" is replaced with an "in-phase input for right and left wheels and anti-phase input for front and rear wheels gain afran".

In step S35, the controller 70 controls the actuator 3A so as to generate the target control force Fc_t at a timing when the reference point Pr passes through the predicted passing position Pf. The timing at which the reference point Pr passes through the predicted passing position Pf can be known from the preview time tp.

By using the preview control using the spring lower displacement map 200 described above, it becomes possible to effectively suppress the vibration of the vehicle 1 (the spring upper structure 5). In particular, by configuring the spring lower displacement map 200 to include the first spring lower displacement map 210 that indicates the correspondence between the position (LAT, LON) and the in-phase input for left and right wheels Zuin, and the second spring lower displacement map 220 that indicates the correspondence between the position (LAT, LON) and the anti-phase for left and right wheels Zuan, it is possible to appropriately reflect the in-phase input for left and right wheels Zuin and the anti-phase for left and right wheels Zuan in the vibration control.

What is claimed is:

1. A computer implemented method for managing a control map used for vibration control of a vehicle,
wherein the control map includes first and second parameter maps,
wherein the first and second parameter maps each represent a correspondence between a position and a parameter related to vertical motion of a reference point based on two or more wheel positions of the vehicle,
wherein the method comprises generating or updating the first parameter map, and generating or updating the second parameter map for the same position as the position at which the first parameter map is generated or updated,
wherein the generating or updating the first parameter map includes calculating (i) an in-phase input for left and right wheels derived from same vertical displacement of a first wheel and a second wheel as the first parameter related to vertical motion of the reference point, based on time series data of parameters related to the vertical motion of the first wheel and time series data of parameters related to the vertical motion of the second wheel, wherein the first wheel is one of a left wheel and a right wheel of the vehicle and the second wheel is the other of the left wheel and the right wheel of the vehicle, wherein the generating or updating the second parameter map includes calculating (ii) an anti-phase input for left and right wheels derived from different vertical displacements of the first wheel and the second wheel as the second parameter related to vertical motion of the reference point, based on the time series data of parameters related to the vertical motion of the first wheel and the time series data of parameters related to the vertical motion of the second wheel.

2. The method according to claim 1,
wherein the generating or updating the first parameter map includes executing a filtering process of the in-phase input for left and right wheels with a first high-pass filter,
wherein the generating or updating the second parameter map includes executing the filtering process of the anti-phase for left and right wheels using a second high-pass filter,
wherein the second high-pass filter is weaker than the first high-pass filter.

3. The method according to claim 1,
wherein the first parameter map includes first and second sub-parameter maps,
wherein the generating or updating the first parameter map further comprises generating or updating the first and second sub-parameter maps,
wherein the generating or updating the first and second sub-parameter maps comprising:
calculating (iii) an in-phase input for left and right wheels derived from same vertical displacements of a third wheel and a fourth wheel, and (iv) an anti-phase for left and right wheels derived from different vertical displacements of the third and the fourth wheels, based on time series data of third and fourth parameters related to the vertical motions of the third and the fourth wheels,
wherein the third wheel and the first wheel constitute front and rear wheels on one side of the vehicle and the fourth wheel and the second wheel constitute front and rear wheels on the other side of the vehicle;
calculating, based on (i) the in-phase input for left and right wheels of the first and second wheels and (iii) the in-phase input for left and right wheels of the third and fourth wheels, (v) an in-phase input for left and right wheels and in-phase input for front and rear wheels derived from the same vertical displacement of the first and second wheels and the same vertical displacement of the first and second wheels and the third and fourth wheels, as the first sub-parameter related to vertical motion of the reference point; and
calculating, based on (i) the in-phase input for left and right wheels of the first and second wheels and (ii) the anti-phase for left and right wheels of the third and fourth wheels, (vi) an in-phase input for right and left wheels and anti-phase input for front and rear wheels derived from the same vertical displacement of the first and second wheels and the different vertical displacement of the first and second wheels and the third and fourth wheels, as the second sub-parameter related to vertical motion of the reference point.

4. The method according to claim 3,
wherein the generating or updating the first and second sub-parameter maps further comprises:
executing the filtering process of the in-phase input for left and right wheels and in-phase input for front and rear wheels using a first sub-high pass filter; and executing the filtering process of the in-phase input for right and left wheels and anti-phase input for front and rear wheels using a second sub-high-pass filter, wherein the second sub-high-pass filter is weaker than the first sub-high-pass filter.

5. The remote support device according to claim 4, wherein the second sub-high-pass filter is stronger than the second high-pass filter.

6. A system for managing the control map used for vibration control of a vehicle, comprising:

one or more processors; and one or more memory devices in which the control map is stored, wherein the control map includes first and second parameter maps, wherein the first and second parameter maps each represent a correspondence between a position and a parameter related to vertical motion of a reference point based on two or more wheel positions of the vehicle, wherein the one or more processors are configured to execute processing to generate or update the first parameter map, and processing to generate or update the second parameter map for the same position as the position at which the first parameter map is generated or updated, wherein the processing to generate or update the first parameter map includes processing to calculate (i) an in-phase input for left and right wheels derived from same vertical displacement of a first wheel and a second wheel as the first parameter related to vertical motion of the reference point, based on time series data of parameters related to the vertical motion of the first wheel and time series data of parameters related to the vertical motion of the second wheel, wherein the first wheel is one of a left wheel and a right wheel of the vehicle and the second wheel is the other of the left wheel and the right wheel of the vehicle, wherein the processing to generate or update the second parameter map includes processing to calculate (ii) an anti-phase input for left and right wheels derived from different vertical displacements of the first wheel and the second wheel as the second parameter related to vertical motion of the reference point, based on the time series data of parameters related to the vertical motion of the first wheel and the time series data of parameters related to the vertical motion of the second wheel.

7. The system according to claim 6, wherein the processing to generate or update the first parameter map includes a filtering process of the in-phase input for left and right wheels with a first high-pass filter, wherein the processing to generate or update the second parameter map includes the filtering process of the anti-phase for left and right wheels using a second high-pass filter, wherein the second high-pass filter is weaker than the first high-pass filter.

* * * * *